March 27, 1962 H. F. GITZINGER 3,027,289
TIRE BUILDING METHOD AND APPARATUS
Filed Feb. 10, 1959 3 Sheets-Sheet 1

INVENTOR.
HARRY F. GITZINGER
BY
W. A. Shira, Jr.
ATTY.

March 27, 1962 H. F. GITZINGER 3,027,289
TIRE BUILDING METHOD AND APPARATUS
Filed Feb. 10, 1959 3 Sheets-Sheet 2
Fig. 2
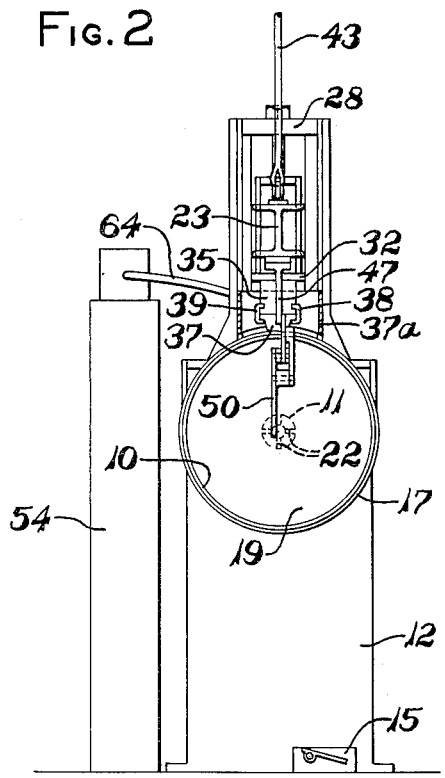
Fig. 3
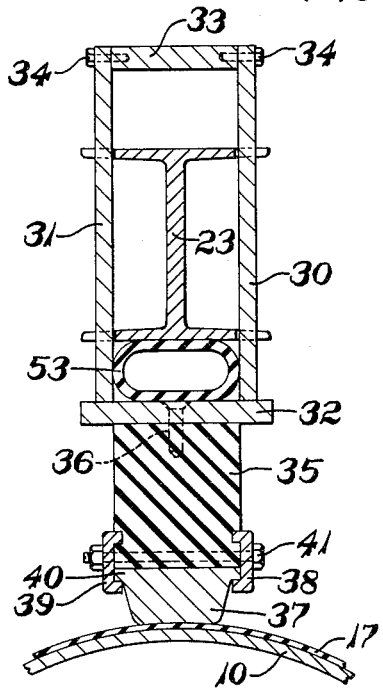
Fig. 4
INVENTOR.
HARRY F. GITZINGER
BY W. A. Shira, Jr.
ATTY.

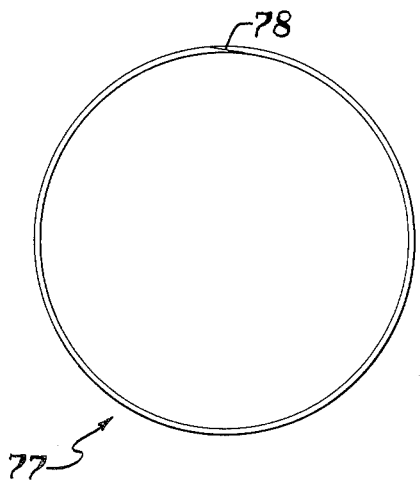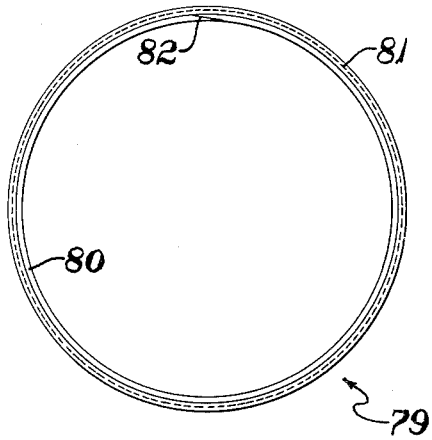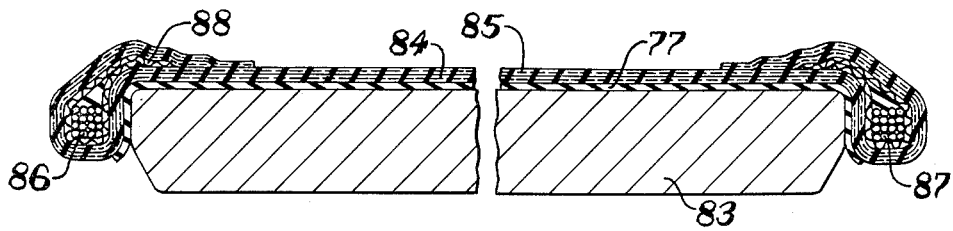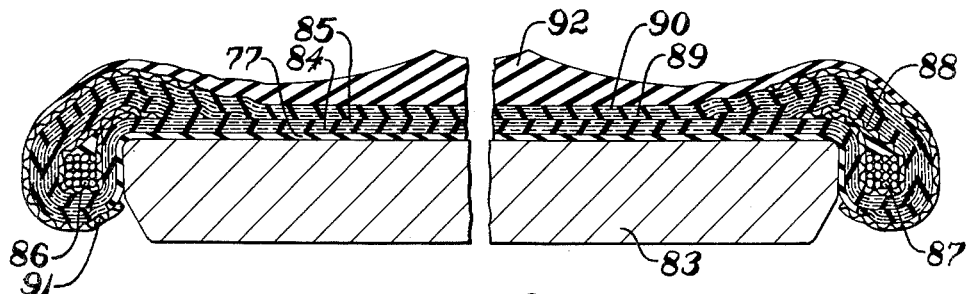

United States Patent Office 3,027,289
Patented Mar. 27, 1962

3,027,289
TIRE BUILDING METHOD AND APPARATUS
Harry F. Gitzinger, Akron, Ohio, assignor to The B. F. Goodrich Company, New York, N.Y., a corporation of New York
Filed Feb. 10, 1959, Ser. No. 792,297
9 Claims. (Cl. 156—132)

This invention relates to a method of making inflatable tires and to an apparatus for performing that method.

Inflatable vehicle tires are generally built in the form of a cylindrical band which is then given a toroidal shape and vulcanized or cured in molds by heat and pressure. Conventionally, the application of heat and pressure to the interior of the tire carcass is effected by steam or hot water which is isolated from contact with the tire carcass by a bladder or water bag. The curing bladders or water bags must be replaced frequently since they are largely rubber which deteriorates rapidly as the result of repeated subjection to curing temperatures. The cost of the bladders or water bags and the time lost in replacing these is a sizable expense in tire manufacture. In addition, many defective tires are frequently the result of defects in the curing bladders or water bags. Moreover, automation of tire curing has been impeded by the need for means to detect defective curing bags or bladders and prevent operation when such are present.

Attempts have been made heretofore to eliminate the use of water bags or curing bladders by simply applying the fluid curing medium directly to the interior of the tire carcass. This was not successful with tires intended for use with inner tubes because the interior of the green or uncured carcass was sufficiently permeable to permit a portion of the curing fluid to penetrate into the carcass casing causing blisters and ply separation. With the advent of tubeless tires employing an interior layer or lining of butyl or other approximately fluid impervious elastomer, there has been renewed interest in the so-called bagless curing of tires by direct contact of the curing medium with the interior of the tire. Unfortunately, it was found that, although the inner layer or lining of butyl or equivalent elastomer was itself sufficiently impervious to the curing medium, the splice where the edges of the uncured elastomer were formed in joining the lining annulus frequently opened allowing penetration of the curing medium into the tire. This opening or separation of the inner lining, and in some cases of the first ply, has also been found to occur in some cases when tires of the tubeless type are cured with the use of a bag or bladder. While tires which develop an opening in the liner splice during curing with a bladder or water bag do not suffer from blisters or ply separation during vulcanization, they do rapidly fail in service as the result of penetration of the inflation air into the carcass through the opening in the splice. Moreover, in those cases where bagless curing has been employed and the splice of the inner liner or first ply did not open, the absence of the smoothing action upon the interior of the carcass by the curing bladder or bag leaves an objectionable ridge on the interior of the tire.

The principal object of this invention is the provision of a method of tire construction and an apparatus for use in performing that method such that the above-mentioned defects are eliminated and a tire carcass can be cured by the direct application of a fluid curing medium to the interior of the green or uncured carcass.

A more specific object of the invention is the provision of a tire construction method and apparatus wherein a strip of approximately fluid impervious elastomer is disposed in an annulus with the end portions of the strip lap spliced and only the spliced region of the annulus is then united by the application thereto of pressure and high frequency electrical energy after which the annulus is utilized as the inner layer or liner of an uncured tire carcass and becomes an integral part of the cured tire.

Other and further objects and advantages of the invention will be apparent from the following detailed description of the presently preferred embodiment described with reference to the accompanying drawings wherein:

FIG. 2 is an end elevational view of the apparatus shown in FIG. 1 as seen from the left-hand side thereof;

FIG. 3 is an enlarged fragmentary transverse sectional view through a portion of the apparatus with the view taken substantially on the section indicating lines 3—3 of FIG. 1;

FIG. 4 is a simplified schematic wiring diagram of the control circuit for the apparatus;

FIG. 5 is a side elevational view of an annulus of elastomer formed from a strip thereof and spliced in accordance with this invention;

FIG. 6 is a view similar to FIG. 5 but showing an annulus comprising an inner layer of elastomer covered by a layer of rubber covered bias-laid cords;

FIG. 7 is a fragmentary sectional view of a conventional tire building drum with a partially completed tire carcass band having an inner liner or annulus similar to FIG. 5; and FIG. 8 is a view similar to FIG. 7 showing completion of the tire carcass band.

Figure 1:
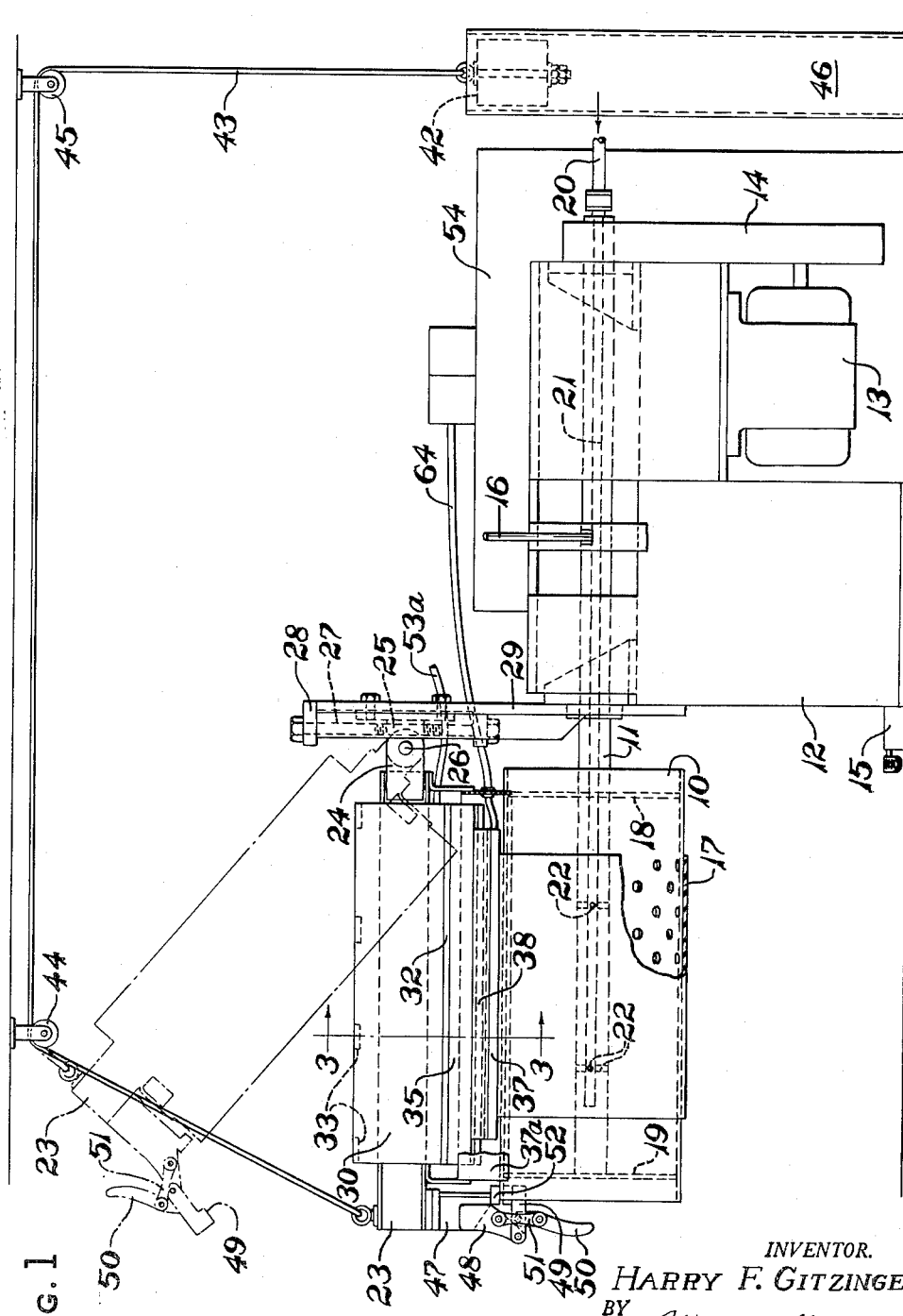
FIG. 1 is a side elevational view of the presently preferred apparatus for forming an annular band from a strip of elastomer and uniting the splice thereof in accordance with this invention.

In accordance with this invention a strip of butyl, or other elastomer of equivalent fluid imperviousness, having a width sufficient to cover the interior of an inflatable tire carcass is formed into an annular band having a diameter corresponding to that of the interior of the uncured tire carcass band. In forming the annulus the ends of the strip are overlapped an amount in the order of one-fourth inch and only the region of the lapped portion is then united sufficiently, by the application of heat and pressure, to withstand the stresses to which the annulus is subjected in its subsequent incorporation into a tire carcass band and the shaping or curing of that band to form the completed tire. The method will be more fully understood from the following description of the presently preferred form of the apparatus which may be employed in practicing the method.

The annulus forming and splicing apparatus shown in FIGS. 1 to 3, inclusive, comprises a drum 10 supported upon shaft 11 projecting from one end of the drum and rotatably mounted in machine housing 12. The housing 12 is of the type commonly employed for tire building machines and is provided with a motor 13 connected with shaft 11 through a conventional drive 14 for effecting rotation of the drum under the control of a pedal operated switch 15. The shaft 11 and/or the motor 13 can be provided with the conventional braking mechanism employed in tire building machines and controlled by the handle 16. The drum 10 is adapted to have a strip of elastomer 17 disposed therearound to form an annulus, the elastomer being supplied from a suitable stock support, not shown, and which is of the conventional type employed in the tire building operations.

The drum 10 is provided with means for facilitating removal of the completed annulus therefrom. In the embodiment shown, this is effected by forming the drum with a hollow interior, closed by recessed ends 18 and 19, to provide a chamber to which air under pressure may be supplied from a hose or pipe 20 communicating with a bore 21 through the shaft 11, which bore is provided interiorly of the drum 10 with radial openings 22.

The surface of the drum has a plurality of perforations that are covered by the annulus formed thereon but when the annulus is to be removed from the drum air is supplied to the interior of the drum and passes through the openings in the surface thus freeing the elastomeric band so that it may be slipped over the free end of the drum. Instead of employing the air under pressure for this purpose as just described, the drum 10 can be made collapsible in the conventional manner employed for tire building drums.

In accordance with this invention the apparatus for forming the elastomer into a band is provided with a means for rapidly effecting a smooth surface splice of the end portions of the strip forming the annulus. This is achieved by uniting the rubber in the region of the splice through the application of heat and pressure thereto. For this purpose, the illustrated apparatus is provided with a heat and pressure applicator which extends axially of the drum for cooperation with the spliced region of the band of elastomer on the drum. In the illustrated embodiment this heat and pressure applicator is supported by a bar 23 the end of which, adjacent the machine housing 12, is provided with ear portions 24 which extend on either side of a vertically adjustable member 25 and are pivoted thereto by a pin 26. The member 25 has a vertically extending threaded bore in which is received a screw 27 which is supported for rotation without axial movement by suitable spaced cars 28 on an upstanding plate 29 attached to the machine housing. The construction is such that rotation of the screw 27 effects vertical adjustment of the bar 23 thereby moving the latter radially relative to the drum 10.

The bar 23 is preferably an I beam and supports the heat and pressure applicator for limited movement radially relative to the drum while restraining movement of the applicator longitudinally of the bar. This is achieved by forming the applicator support of two spaced vertically extending plates 30 and 31 the bottoms of which are secured to a horizontally extending plate 32 by welding or the like. The plates 30 and 31 extend on either side of the central web of the bar 23 and the flanges of the latter are cut away, intermediate the ends, to provide guiding surfaces for the plates 30 and 31 which are spaced apart a distance less than the uncut width of the flanges; see FIG. 3. The upper edges of the plates 30 and 31 are interconnected by a plurality of spaced transversely extending bars 33 which are removably connected to the plates 30 and 31 by suitable means such as screws 34. The width of the plates 30 and 31, as measured in the vertical direction of the apparatus, is greater than the width of the bar 23 so that the assembly of the plates 30, 31 and 32 with the spacer bars 33 can move a limited distance vertically with respect to the bar 23.

Secured to the lower surface of the plate 32 is an elongated member 35 formed of electrically insulating material, the member 35 being held to the bar 23 by suitable means, as for example screws 36. Upon the lower surface of the member 35 is supported an elongated electrically conductive member or bar 37, this being effected by substantially U-shape brackets 38 and 39 engaging longitudinally extending shoulder portions 40 on the member 37 and longitudinally extending grooves in the lower portions of the sides of the insulator 35, the U-shape members being retained in position by bolts 41. The lower surface of the electrically conductive member 37 is adapted to contact the elastomeric material 17 on the drum 10 and apply heat and pressure thereto in an axially extending region of limited circumferential extent. For this purpose, the lower surface of the member 37 is made concave and preferably has a radius somewhat greater than that of the drum 10. A grounded metallic shield 37a is secured to the bar 23 and extends around the sides and ends of the member 37 in spaced relationship thereto.

The bar 23 with the heat and pressure-applying mechanism may be swung from the full line position shown in FIG. 1 to the broken line position also shown in that figure to facilitate placing of the elastomeric material upon the drum and removal therefrom of the completed annulus. In order to retain the bar 23 and the mechanism carried thereby in its elevated position and to facilitate its raising and lowering suitable counterbalancing means are provided which in the illustrated embodiment comprise a weight 42 connected by a flexible cable 43 to the free end of the bar 23, cable 43 extending over suitable direction changing pulleys 44 and 45 to dispose the weight 42 at the rear of the machine where it is vertically movable in a suitable housing or guide 46.

The bar 23 is retained in its lower position to permit the application of pressure between the member 37 and the elastomer on the drum 10 by a suitable clamp carried by the bar and engaging the drum. Thus, the free end of the bar 23 is provided with a depending plate 47 to which is attached a latch supporting plate 48. Adjacent the lower end of the plate 48 is pivoted a latch member 49 the free end of which is adapted to engage the interior of the drum 10 adjacent the free end of the latter. Intermediate the pivotal mounting and the free end of the latch member 49 there is pivoted thereto the upper end of an operating handle 50 and pivoted to the latter, intermediate its ends, is a link 51 that has its upper end pivoted to the plate 48. The lower end of the depending plate 47 is provided with a pad 52 which engages the outer periphery of the drum 10 adjacent the edge thereof and above the inner end of the latch member 49, as will be apparent from FIGS. 1 and 2, thus securely latching the bar 23 in the full line position shown in FIG. 1. The latch is released by clockwise rotation of the handle 50 thus freeing the bar 23 for movement to the broken line shown in FIG. 1.

When the beam or bar 23 is in its position extending axially of the drum 10, as indicated in full lines in FIG. 1, and is latched to the drum 10, pressure can be exerted upon elastomer between the electrically conductive member 37 and the drum 10 by moving the supporting structure for the member 37 radially inwardly relative to the beam or bar 23. This is achieved in the apparatus illustrated by an inflatable tube 53 interposed between the lower flange of the bar 23 and the upper surface of the lower plate 32 of the support for the member 37. The tube 53 may be of conventional construction employed in hose manufacture and the tube extends axially between the bar 23 and plate 32 for substantially the entire length of the latter. The end of the tube 53 adjacent the free end of the bar 23 is sealed shut by a suitable clamp, not shown, while the other end of the tube is connected to a pipe or hose 53a for supplying air under pressure to inflate the tube 53 and force the member 37 radially inwardly relative to the drum 10 thereby exerting pressure upon the elastomer 17 between the drum and the member.

The heat for uniting the spliced region of the elastomeric material 17, comprising the annulus formed on the drum 10, is dielectrically produced by a high frequency field of electrical energy established between the drum 10 and the conductive member 37. For this purpose, the apparatus includes a high frequency generator 54 which may be of the conventional tuned oscillator type. The energizing and control circuit for this portion of the apparatus is schematically illustrated in FIG. 4 of the drawings. As shown therein, single phase alternating current is supplied to the generator 54 from the power supply lines 55 and 56 through a disconnect switch 57 and fuses 58 and 59, the circuit extending from the fuses 58 and 59 through the input leads 60 and 61 of the generator 54. One output lead 62 of the generator is grounded as is also the drum 10 and the machine frame 12. The other output lead 63 of the generator is connected to the conductive member 37 through a shielded cable 64, see FIG. 1.

The generator 54 is energized when the disconnect switch 57 is closed but the output thereof is blocked under control of the operator through a control circuit shown in FIG. 4. The power for the control circuit is derived from a transformer T the primary 65 of which is connected to the fuses 58 and 59 while the secondary 66 is connected to the supply lines 67 and 68 of the control circuit. The supply line 67 is connected to one side of a start switch 69 the other side of which is connected to one terminal of a timing motor 70. The other terminal of the motor 70 is connected to one side of a first contact 71a of a stop switch 71. The other side of the circuit controlled by the contact 71a is connected by a wire 72 to one terminal of a solenoid 73 for operating a valve in the air supply line 53a for the inflatable tube 53. The other terminal of the solenoid 73 is connected with the control circuit supply line 68. Connected in parallel about the timing motor 70 is the coil 74 of a holding relay the contact 74a of which is connected in series with contact 70a actuated by the motor 70 with the contacts 74a and 70a disposed in a circuit which is bridged about the starting switch 69. The timing motor 70 also actuates a second contact 70b which is disposed in the control circuit of the generator 54 in series with an indicator lamp 75, a contact 71b of stop switch 71, and the contact of a switch 76 which is positioned for closing when the conductive member 37 is in engagement with the elastomeric material on the drum 10. The switch 76 is therefore carried by the member 23 for actuation through engagement with the drum 10 as, for example, by supporting the switch on the pad 52.

The operation of the apparatus can best be understood from a description of the steps performed in practicing the method. This comprises supplying a strip of elastomeric material 17 to the drum 10 from a suitable source, not shown, while the beam 23, and the mechanism carried thereby, is in the elevated portion indicated in broken lines in FIG. 1. The strip 17 is wrapped one or more times about the drum 10 to provide an annulus of the desired thickness, this being effected by the operator actuating the switch 15 to control the motor 13 for rotation of the drum. If but one convolution of the material 17 is to be employed, the material is severed so that the end portions thereof are lapped a distance in the order of one-quarter inch. Rotation of the drum 10 is then stopped with the lapped or spliced portion in vertical alignment beneath the beam 23 and the mechanism carried thereby, positioning of the drum being effected by the operator through operation of switch 15 and the brake 16. When the drum has thus been positioned, the beam 23 is lowered and is latched in its lowered position, indicated in full lines in FIG. 1, through actuation of the latch mechanism controlled by the handle 50. This closes the switch 76 in the control circuit of the high frequency generator 54 but the control circuit is still open at the contact 70b of the timing motor.

The operator then depresses the start switch 69 and holds the switch depressed until the lamp 75 is lighted. This actuation of the start switch 69 completes a circuit through the latter to a timing motor 70 thus energizing the latter and also the solenoid 73. Energization of the latter opens the valve in the air line 53a supplying air under pressure to the tube 53 so that the conductive member 37 is pressed into firm engagement with the splice of the elastomer material between the member and the drum. Operation of the motor 70 causes the latter to close the contacts 70a and 70b controlled by the motor. Closing of the contact 70b completes the control circuit for the generator 54 so that the high frequency electrical energy is supplied to the drum 10 and member 37, this being indicated by lighted condition of the lamp 75. The closing of contact 70a completes a holding circuit about the start switch 69 which circuit is also controlled by the contact 74a of the holding coil 74 that was energized when the motor 70 was energized. Hence, the start switch need only be held closed until the lamp 75 is lighted and is then released.

When electrical energy has been supplied for the predetermined time, as controlled by operation of the motor 70, the latter opens its contacts 70a and 70b. Opening of the contact 70a breaks the holding circuit around the start switch 69 thereby de-energizing the holding coil 74, the motor 70, and the solenoid 73 of the valve controlling the application of inflation pressure to the tube 53. Opening of the contact 70b interrupts the control circuit for the generator 54 terminating the supply of electrical energy to the member 37 and drum 10. This is indicated by the lamp 75 which is extinguished by the opening of the control circuit. The operator then releases the latch through actuation of the handle 50 and raises the heating and pressure applicating mechanism to the broken line position in FIG. 1. The annulus with the spliced region securely united is then removed from the drum 10 through application of air under pressure to the interior of the drum as will now be readily apparent. The completed annulus 77, as shown in FIG. 5, will have a smooth splice 78 substantially free of external or internal ridges and the splice is prevented from separation by virtue of the union secured by the application of heat and pressure.

The union of the spliced region is not effected by vulcanization since the temperature of the material is only raised to in the order of 150° F. for a period of time less than one minute. The secure union of the splice may perhaps be explained as due to interdiffusion of the molecules of the lapped portions of the annulus which is facilitated by the increased activity of the molecules resulting from the high frequence electrical field applied thereto and the intimate relationship provided by the applied pressure. With the apparatus here illustrated, a satisfactory splice, in which the lapped portions are rendered substantially integral, can be achieved in a period of 5 to 11 seconds when the air pressure supplied to the inflatable member is in the order of 80 lbs./sq. in. and the generator 54 has an output in the order of 5 kilowatts at a frequency of 34 megacycles.

The annulus 77 may be transferred to a conventional tire building drum and have the usual carcass plies, bead cores, tread and sidewall materials supplied thereto, after which the completed tire is cured. The curing or vulcanization of the completed tire may be effected by the application of the curing medium directly to the interior of the carcass provided with the band 77 since the splice 78 is not separated under the temperatures and pressures developed during the curing operation. Moreover, the completed tire will be devoid of a ridge on the interior in the region of the splice 78 since this region was subjected to pressure as well as heat during the forming of the splice.

It is not necessary that the annulus 77 be formed of but a single ply of elastomeric material nor that this annulus be removed from the drum 10 immediately after it is formed. Instead, the annulus can be formed of more than one convolution of elastomeric material in which event the end portions are so disposed as to be in superposed relationship so that a single operation of the pressure and heating mechanism will form a smooth union of the end portions of the strip to the annulus. The method and apparatus may also be employed to form an annulus from a composite strip wherein the strip comprises a layer of elastomeric material and a superposed layer of elastomer coated bias-laid cords. FIG. 6 shows an annulus 79 formed of such a composite strip with the inner surface formed of an elastomer 80 and the outer surface formed of bias-laid cords 81. In forming an annulus from such a composite strip, the latter is positioned upon the drum 10 as a single convolution and a few end cords are stripped from the width of the layer 81 so that the end portions of the elastomer layer 80 can be overlapped approximately one-fourth inch with the edge portions of the cord layer 81 in abutting relationship.

It will be understood that in this case the splice will extend at an angle to the axis of the drum corresponding to the angle of the cords in the layer 81. Hence, the heating and pressure applying mechanism will be shaped complementary to the surface of the drum beneath the spliced region. The apparatus will be otherwise constructed and operated as above described to form the splice 82 as indicated in FIG. 6.

As mentioned heretofore, the spliced annulus comprising either the single layer of elastomer, as indicated in FIG. 5, a plurality of such layers, or a layer of elastomer and a layer of bias-laid cords, as shown in FIG. 6, need not be removed from the drum 10 immediately upon forming the annulus. Instead, the drum 10 may be employed in the manner of a conventional tire building drum to apply one or more tire carcass plies of bias-laid cord. This can be effected, as will be readily understood, through operation of the switch 15 and the brake 16 controlling the rotation of the drum 10, the stock for forming the plies being provided from a suitable supply means well known in the art. Preferably, however, to facilitate the application of bead cores and the subsequent building operations, not more than two of the four carcass plies of a four-ply tire are thus assembled on the drum 10 before the band is removed from the drum and transferred to a conventional tire building machine.

A tire incorporating an elastomeric annulus having a heat and pressure united splice, as described above, is completed upon a conventional tire building machine by superposing additional carcass plies, providing bead cores, and the other tire components by operations well known in the art. Thus, as indicated in FIG. 7, the spliced annulus, such as 77, disposed on a conventional tire building drum 83 has superposed thereover two plies 84 and 85 of bias-laid elastomer coated cords with the cords extending at an angle to the circumferential center line of the drum and with the cords in the separate plies extending in opposite directions. The edge portions of these plies are turned about bead cores 86 and 87 which may be provided with the conventional flippers 88. For a four-ply tire, two additional plies 89 and 90 of bias-laid cords are then superposed in the conventional manner and the edge portions of these plies are turned around the bead cores 86 and 87. Finishing strips 91 may then be applied in the bead regions of the tire and the tread and sidewall rubber 92 applied over the carcass to form an uncured or green tire carcass in band form, see FIG. 8. This carcass is then removed from the building drum 83, shaped to a toroidal configuration, and vulcanized by the application of heat and pressure through direct application of a fluid curing medium to the interior of the carcass. The completed tire will not evidence an objectionable ridge in the region of the splice of the liner since this was avoided through the secure union of the liner splice in forming the annulus thereof prior to completion of the tire. It is, therefore, unnecessary to have the pressuring action of a bladder or water bag to prevent the formation of ridges on the interior of the tire. Moreover, the spliced region of the interior liner or layer withstands the stresses of shaping and curing without separation thus preventing the production of defective tires. Moreover, since no water bag or bladder is needed, the cost of these members can be eliminated as well as the defects which result from their use.

The invention has been described specifically with reference to its use in forming tubeless tires suitable for cure without a bladder or water bag. However, the procedure and apparatus of this invention can be effectively used on tires which are to be provided with an inner tube and which do not have an approximately air-impervious liner or inner layer so that a water bag or bladder is needed during curing. In such a case the method and apparatus are employed to form a splice for the first or inner ply, this ply being formed of elastomer-coated cords without a continuous interior layer of elastomeric material. An advantage of thus forming a conventional tire is that the separation of the splice of the first or inner ply which has been found to occur in some instances is obviated thus preventing the development of tire defects resulting from such separation during use of the tire. Likewise, the invention may be employed in forming tubeless tires whether or not these be cured by direct application of the curing medium to the interior of the tire or through the use of a bladder or water bag. However, the maximum advantages of the invention are achieved when employed in forming tubeless tires and then curing these without the use of a bladder or water bag.

The tires specifically described are of four-ply construction. It will be apparent, however, that the invention is not restricted in this respect but can be used in building tires of greater or lesser number of plies. It will also be apparent that the invention is not limited to the values of pressure, time or electrical energy specifically mentioned for the secure uniting of the spliced region of the elastomeric annulus so long as the union is sufficient to prevent separation of the splice during shaping and curing of the tire. In view of these and other variants and utilizations of the invention, which will be evident to those skilled in the art, the invention is not to be considered as limited except as required by the appended claims.

Having thus described the invention, I claim:

1. In the method of building an inflatable tire suitable for vulcanization by direct application of a fluid curing medium to the interior of the tire, the steps of lap splicing the end portions of a strip of fluid impervious rubber on a cylindrical drum to provide an annular band, subjecting the spliced region of the band while on said drum to pressure and dielectrical heating sufficient to securely unite the said region, and incorporating the said band as the integral inner surface of an uncured tire carcass.

2. In the method of building an inflatable tire, the steps of providing a strip comprising a layer of approximately fluid impervious elastomer and a superposed layer of elastomer coated bias-laid cords, disposing said strip in the form of an annulus about a cylindrical drum with the end portions of the layer of elastomer overlapping and the end portions of the layer of cords in abutting relationship, subjecting the said end portions of the strip to pressure and dielectric heating while on said drum to securely unite the said portions sufficiently to prevent subsequent separation of the said end portions, and incorporating the said annulus as the integral interior of an uncured tire carcass.

3. The method of building an inflatable tire suitable for vulcanization by direct application of a fluid curing medium to the interior of the tire comprising disposing a strip of rubber about a cylindrical drum in a manner such that the strip has the shape of an annulus with the end portions of the strip lapped and with the annulus corresponding in diameter and width to the dimensions of the interior of an uncured tire carcass, subjecting the end portions of the strip while on said drum to pressure and dielectric heating for a time interval of less than one minute to securely unite the annulus in the region of said end portions without complete vulcanization thereof, applying over said annulus a plurality of plies of elastomer-coated cords with the cords in one ply extending at an angle relative to the circumferential center line of the tire and with the cords in different plies extending in opposite directions, applying inextensible bead cores adjacent the side edges of said plies, turning the edges of the said plies around the said bead cores to form an uncured tire carcass, and applying tread and sidewall forming rubber to said carcass.

4. An apparatus of the type described comprising an electrically conductive drum adapted to have a rubber strip removably wrapped thereabout in the form of an annulus, means rotatably supporting said drum at only one end with the other end free, means to selectively effect rotation of said drum, an elongated electrically conductive member having a length sufficient ot extend from edge to edge of the said annulus, means supporting said member for movement to and from engagement with the entire width of a circumferential region of said annulus, means to apply high frequency electrical energy to said member and drum to thereby dielectrically heat and securely unit the region of the rubber between the said drum and member, and means for facilitating removal of said annulus over the free end of the drum.

5. An apparatus of the type described comprising an electrically conductive cylindrical drum adapted to have a strip of rubber removably wrapped thereabout in the form of an annulus, a bar extending lengthwise of said drum adjacent the outer surface thereof, means supporting said bar for movement toward and from said drum, means including an electrically conductive portion supported upon the side of the bar adjacent said drum for radial movement relative to the bar and drum into pressure-exerting engagement with that region of a strip of rubber on the drum between the latter and the said bar, means to establish a field of high frequency electrical energy extending through the said region of the rubber and between said electrically conductive portion and drum, and means to automatically terminate the said electrical field after a period of predetermined duration.

6. An apparatus of the type described comprising an electrically conductive cylindrical drum adapted to have a strip of rubber removably wrapped thereabout in the form of an annulus, a bar extending axially of said drum adjacent the outer surface thereof, means pivotally supporting one end of said bar for swinging movement toward and from said drum, an electrically conductive member extending longitudinally of said bar and supported upon the side thereof adjacent said drum in a manner permitting movement of the member radially relative to the drum, inflatable means between said bar and member adapted to move the latter into engagement with a strip of rubber on the drum and exert pressure thereon, a source of high frequency electrical energy, means connecting said source to said drum and member, and an electrical control circuit including means to control the application of fluid pressure to said inflatable means and the flow of electrical energy from said source to said drum and member.

7. An apparatus as defined in claim 6 further comprising switch means in said control circuit preventing the application of electrical energy to said member and drum except when the former is disposed closely adjacent the surface of the latter.

8. An apparatus as defined in claim 6 wherein the said drum is rotatably supported and the apparatus further comprises means to rotate said drum for the disposal of a strip of rubber thereabout in the form of an annulus, the said drum including means for facilitating removal thereform of the said annulus.

9. An apparatus of the type described comprising an electrically conductive rotatably supported cylindrical drum adapted to have a strip of rubber removably wrapped thereabout in the form of an annulus, a bar extending axially of said drum adjacent the outer surface thereof, means pivotally supporting one end of said bar for swinging movement toward and from said drum, means to releasably secure said bar to said drum, an electrically conductive member extending longitudinally of said bar and supported upon the side thereof adjacent said drum in a manner permitting movement of the member radially relative to the drum, an inflatable tube between said bar and member adapted to move the latter into engagement with a strip of rubber on the drum and exert pressure thereon when the bar is secured to the drum, a source of high frequency electrical energy, means connecting said source to said drum and member, and an electrical control circuit including means to control the application of fluid pressure to said inflatable tube and the flow of electrical energy from said source to said drum and member, the said control circuit also including a timing mechanism for automatically terminating the said application of fluid pressure and supply of electrical energy after a predetermined interval of time.

References Cited in the file of this patent

UNITED STATES PATENTS

| | | |
|---|---|---|
| 1,289,771 | Hopkinson | Dec. 31, 1918 |
| 1,289,773 | Hopkinson | Dec. 31, 1918 |
| 1,389,442 | De Mattia | Aug. 30, 1921 |
| 1,643,202 | Denmire | Sept. 20, 1927 |
| 1,670,445 | Gammeta | May 22, 1928 |
| 1,921,473 | Mather | Aug. 8, 1933 |
| 2,438,498 | Geist | Mar. 30, 1948 |
| 2,451,992 | Te Grotenhuis | Oct. 19, 1948 |
| 2,713,382 | Bosumworth | July 19, 1955 |

FOREIGN PATENTS

| | | |
|---|---|---|
| 200,379 | Australia | May 11, 1954 |

UNITED STATES PATENT OFFICE
CERTIFICATE OF CORRECTION

Patent No. 3,027,289                                March 27, 1962

Harry F. Gitzinger

It is hereby certified that error appears in the above numbered patent requiring correction and that the said Letters Patent should read as corrected below.

Column 3, line 28, for "cars" read -- ears --; column 9, line 3, for "ot" read -- to --; line 9, for "unit" read -- unite --.

Signed and sealed this 27th day of November 1962.

(SEAL)
Attest:
ESTON G. JOHNSON
Attesting Officer

DAVID L. LADD
Commissioner of Patents